United States Patent
Kahn (10) Patent No.: US 10,412,174 B2
(45) Date of Patent: Sep. 10, 2019

(54) CONFIGURABLE INTERFACE FOR A VIRTUAL FUNCTION IN A COMMUNICATION SYSTEM

(71) Applicant: Alcatel-Lucent USA Inc., Murray Hill, NJ (US)

(72) Inventor: Colin Leon Kahn, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 270 days.

(21) Appl. No.: 15/383,671

(22) Filed: Dec. 19, 2016

(65) Prior Publication Data

US 2018/0176306 A1    Jun. 21, 2018

(51) Int. Cl.
| | | |
|---|---|---|
| G06F 15/16 | (2006.01) |
| H04L 29/08 | (2006.01) |
| H04L 12/18 | (2006.01) |
| G06F 9/455 | (2018.01) |
| H04L 12/46 | (2006.01) |

(52) U.S. Cl.
CPC ........ *H04L 67/141* (2013.01); *G06F 9/45558* (2013.01); *H04L 12/18* (2013.01); *H04L 12/4641* (2013.01); *G06F 2009/45595* (2013.01)

(58) Field of Classification Search
CPC ... H04L 67/141; H04L 12/18; H04L 12/4641; G06F 9/45558; G06F 2009/45595
USPC .......................................................... 709/227
See application file for complete search history.

(56) References Cited

U.S. PATENT DOCUMENTS

2017/0308415 A1* 10/2017 Das ...................... G06F 9/45533

* cited by examiner

*Primary Examiner* — Wing F Chan
*Assistant Examiner* — Joseph R Maniwang (57) ABSTRACT

A first virtual function is instantiated using a virtual infrastructure that is deployed over at least one server in a communication system. A first subset of interface modules is selected from a set of interface modules and a first interface to the first virtual function is configured using the first subset. Communication is established between the first virtual function and a second virtual function over the first interface based on a first interface module in the first subset and a second interface module. A second interface to the second virtual function is configured using the second interface module. The first interface module is compatible with the second interface module.

20 Claims, 7 Drawing Sheets

400

| VIRTUAL FUNCTION | IF MODULES | COMPATIBLE |
|---|---|---|
| MOBILITY MANAGEMENT | A, B, E | B, A, F |
| AUTHENTICATION | B, C, D | A, D, C |
| SESSION MANAGEMENT | A, C, D, E | B, D, C, F |
| CHARGING | C, F | D, E |
| LAWFUL INTERCEPT | A, D | B, C |
| RAN | B, C, D | A, D, C |
| USER PLANE | B, F | A, E |
| ⋮ | | |

CONFIGURABLE INTERFACE FOR A VIRTUAL FUNCTION IN A COMMUNICATION SYSTEM

BACKGROUND

Conventional communication systems include multiple network elements such as entities, nodes, and gateways that implement different sets of functions to support wireless communication. For example, the evolved packet core (EPC) network defined by the Third Generation Partnership Project (3GPP) includes a mobility management entity (MME) to implement functions including authentication and mobility management, a serving gateway (SGW) to implement functions including lawful intercept and providing a mobility anchor for user equipment, a packet data node (PDN) gateway (PGW) to implement functions including charging and policy/rate enforcement, and an authentication, authorization, and accounting (AAA) entity to implement functions including authentication and charging. For another example, a general packet radio service (GPRS) network includes nodes such as a gateway GPRS support node (GGSN) to implement functions including packet routing and forwarding and a serving GPRS support node (SGSN) to implement functions including packet routing, mobility management, authentication, and charging. Interfaces between the functions implemented in the network elements are referred to as reference points, which have defined sets of capabilities and protocols. Each network element supports multiple interfaces to multiple other network elements. For example, an SGW in an EPC network supports an interface to an MME, interfaces to one or more PGWs that are connected to corresponding external networks, and one or more interfaces to base stations or eNodeBs in the communication system. The network element can also support interfaces to an SGSN for 3G interworking and to a PCRF for non-3GPP access policy control.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Grouping network functions into a constrained number of network elements including an MME, SGW, PGW, AAA, GGSN, and SGSN limits the number of interfaces that are defined (and in some cases standardized) in a communication system. However, the network elements and corresponding interfaces in a conventional wireless communication system are designed for a specific use case: conveying broadband user data for multifunction wireless communication devices such as smart phones, tablets, laptops, and the like. The conventional network architecture is not optimal for other use cases, particularly cases that do not require all of the functions supported by the network elements in the wireless communication system. For example, long battery life and low cost are high priorities for wireless communication devices in the Internet of Things (IoT). Authentication functionality is important for IoT devices, but IoT devices that need not be reached from the network typically do not utilize idle mode mobility functions or active mobility management functions, which unnecessarily consume network resources, reduce battery life, and increase cost. For another example, wireless communication in a "connectionless" mode does not require establishing radio bearers between the user equipment and network elements such a base station or an MME. Functions in these network elements that support bearer management are therefore unnecessary. Hence to support networks that provide only the necessary functions, the granularity of functions needs to be finer than has historically been the case in mobile networks. However, adding functions also means adding additional interfaces that are tailored to support the different usage scenarios, and this leads to a proliferation of standardized interfaces that is not scalable in complex networks.

A flexible and scalable network architecture implements a set of virtual functions that each support a single configurable interface to other virtual functions. A configurable interface is defined for each of the virtual functions using combinations of one or more interface modules that provide access to services of the corresponding virtual function. When a virtual function is defined, the interface modules are chosen from a set of interface modules that are available for use by the virtual functions or new interface modules that can be created. For example, the set of interface modules can include a control plane interface module that supports messages that are transmitted by virtual functions to program routes in a radio access network, and a user plane interface module that supports messages that are received by virtual functions and used to configure the virtual functions to route messages through the radio access network. Virtual functions are not required to support any particular interface module and so the interface for each virtual function can be configured to include the smallest number of interface modules that are necessary to provide the services of the virtual function. The interface modules can be standardized or proprietary.

Different virtual functions are able to communicate with each other if their corresponding interfaces support compatible interface modules. For example, a first virtual function that implements a first interface including the control plane interface module is able to communicate with a second virtual function that implements a second interface including the user plane interface module because the messages transmitted according to the control plane interface module are compatible with the messages received according to the user plane interface module used by the second virtual function. The same applies between a first virtual function that implements a first interface including the control plane interface module that can communicate with a second virtual function that implements a second interface including a second control plane module because the messages transmitted according to the first control plane interface module are compatible with the messages received according to the second control plane interface module used by the second virtual function. The same interface modules can be used by different virtual functions. For example, the interfaces for mobility management functions, session management functions, and lawful intercept functions can be configured to include control plane interface modules or user plane interface modules for programming routes. The virtual functions advertise the interface modules supported by their interfaces, e.g., using a broadcast mechanism, a query/response mechanism with other virtual functions, or by providing information to a registry that stores information defining the interfaces for a set of virtual functions. Virtual functions are therefore able to determine the identities of other virtual functions that support compatible interface modules so that the virtual functions can communicate to exchange services.

Network function virtualization (NFV) implements virtual functions on top of a virtual infrastructure that is deployed over general-purpose servers. For example, an NFV architecture typically includes computing hardware such as processors or servers, storage hardware such as memory devices, and network hardware to interconnect the computing and storage hardware. The computing, storage, and network hardware is virtualized to provide virtual computing, storage, and networking resources such as virtual machines that can run applications using instances of an operating system executing on the virtual machine. Virtual networks may also be created using virtual routers implemented with the virtual computing and network resources. The virtual resources may be used to implement virtual network functions such as routing, load-balancing, firewalls, and the like. Virtual resources can use any combination of hardware and the hardware used to implement the virtual resources can change dynamically.

Virtual functions are implemented using dynamically variable combinations of virtual resources and hardware. Some embodiments of virtual functions implement microfunctions such as mobility management, authentication, session management, charging, lawful intercept, radio access network functionality, user plane functionality, and the like. The virtual resources (as well as the corresponding hardware) used to implement the virtual functions can change depending on network conditions such as the volume of traffic served by the virtual network. Virtual functions are also able to migrate among the available virtual resources or hardware. Since hardware and virtual resources are dynamically allocated, the NFV architecture allows for operational efficiencies such as dynamic creation of applications, service chaining, scaling, and healing.

Figure 1:
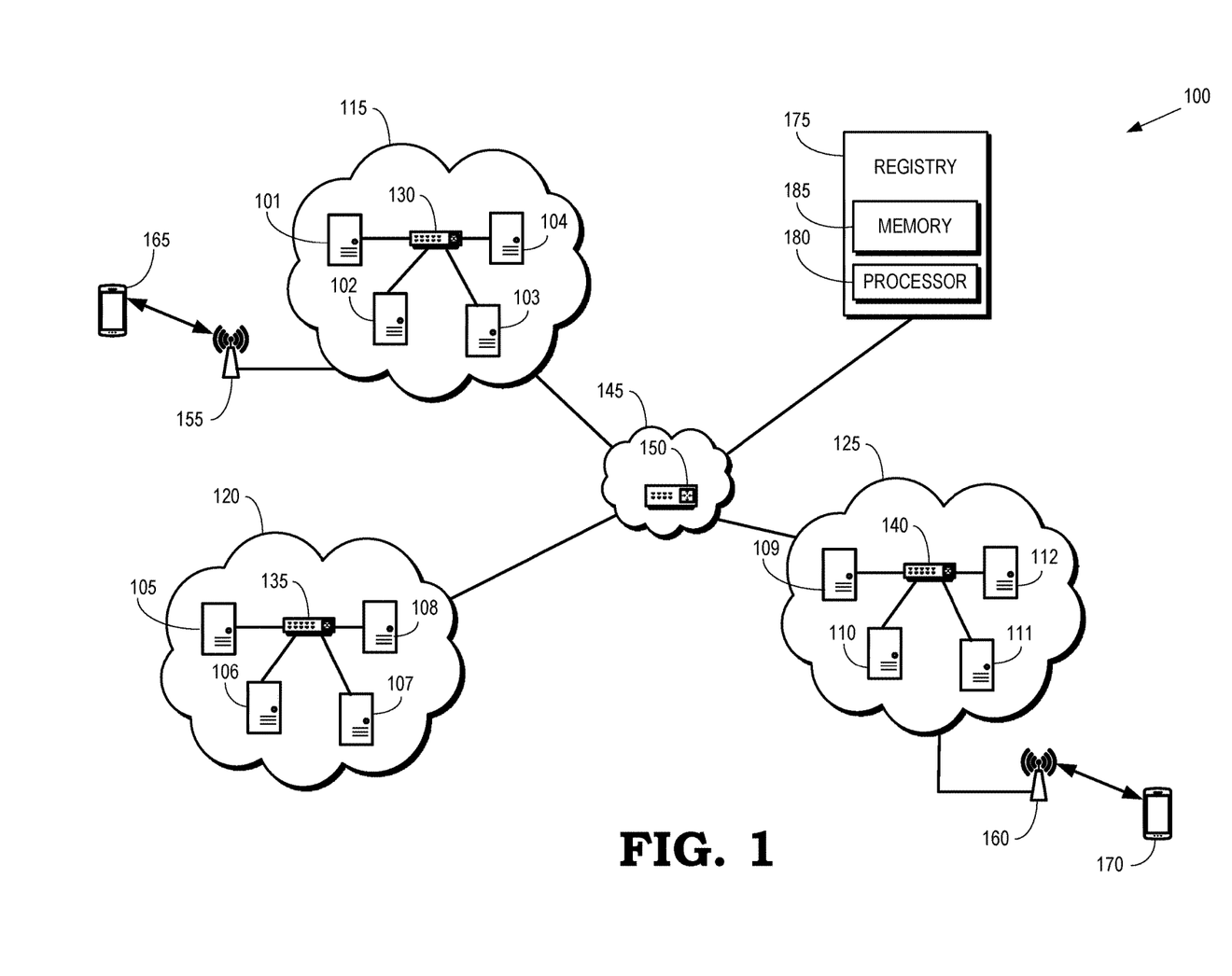
FIG. 1 illustrates a communication network that implements network function virtualization (NFV) according to some embodiments.

FIG. 1 illustrates a communication network 100 that implements network function virtualization (NFV) according to some embodiments. The communication network 100 includes hardware computing resources such as servers 101, 102, 103, 104, 105, 106, 107, 108, 109, 110, 111, 112 (collectively referred to herein as "the servers 101-112"). Some embodiments of the servers 101-112 are implemented using processing units such as central processing units (CPUs), graphics processing units (GPUs), accelerated processing units (APUs), processor cores, compute units, application-specific integrated circuits (ASICs), field programmable gate arrays (FPGAs), and the like. Some embodiments of the servers 101-112 also include hardware storage resources such as memories (not shown in FIG. 1) for storing data or instructions that may be used by the servers 101-112, the results of operations performed by the servers 101-112, and the like.

The servers 101-112 are partitioned into interconnected groups. For example, the servers 101-104 can be interconnected as part of an intranet 115, the servers 105-108 can be interconnected as part of an intranet 120, and the servers 109-112 can be interconnected as part of an intranet 125. The intranets 115, 120, 125 are formed using hardware network resources 130, 135, 140 such as switches, routers, cables, optical fiber, and the like. The servers 101-112 in the intranets 115, 120, 125 can also be interconnected as part of a network 145 that may be formed using additional hardware network resources 150 such as switches, routers, cables, optical fiber, and the like.

The communication network 100 also includes radio access networks 155, 160 for providing wireless connectivity. The radio access networks 155, 160 can also be referred to as (or include) base stations, access points, base station routers, macro cells, microcells, femtocells, and the like. The radio access networks 155, 160 communicate with one or more user equipment 165, 170 over corresponding air interfaces. As used herein, the term "user equipment" refers to a device that is able to establish a wireless connection with the communication network 100 and transmit or receive information over an air interface. The user equipment 165, 170 can therefore include smart phones, tablet computers, wireless-enabled wristwatches, wireless-enabled laptop computers, as well as other wireless-enabled devices such as home appliances, power meters, water meters, vehicles, and the like. Thus, user equipment are not required to be owned by, operated by, or otherwise associated with a "user" such as a person.

The hardware computing, storage, and network resources in the communication network 100 are used to implement an NFV architecture. For example, the hardware computing, storage, and network resources can be used to implement corresponding virtual computing, storage, and network resources, which are used to implement virtual network functions. Resources of one or more of the servers 101-112 are used to instantiate virtual functions using the virtual infrastructure of the NFV architecture. As used herein, the term "instantiate" refers to initiating, configuring, and organizing portions of the hardware computing, storage, and network resources to perform the operations required by the virtual functions. Examples of virtual functions that can be implemented in the virtual infrastructure include mobility management, authentication, session management, charging, lawful intercept, radio access network functionality, user plane functionality, and the like. Some embodiments of the servers 101-112 are also able to instantiate virtual functions at other, finer levels of granularity. Each virtual function communicates with other virtual functions in the wireless communication system 100 using a single interface that is configured using a subset of interface modules that is selected from a set of interface modules.

The virtual functions advertise their supported interface modules so that other virtual functions can identify compatible interface modules used to configure the interface. In the illustrated embodiment, the virtual functions publish information identifying the virtual function and the subset of interface modules supported by its interface to a registry 175 that is implemented using a processor 180 and a memory 185. Some embodiments of the registry 175 also contain additional information about the virtual functions such as their capabilities, capacities, current loading, and the like. The registry 175 stores the published information for the virtual functions, receives requests for information identifying the virtual functions or the interface modules supported by the virtual functions, and provides the requested information to the requesting virtual function. Some embodiments of the communication network 100 support other techniques for advertising the virtual functions and interface modules such as broadcasting the information throughout the communication network 100 or establishing query-response relationships between the virtual functions that enable the virtual functions to discover and query each other to determine the supported interface modules, and the like. Communication can then be established between the virtual functions using the compatible interface modules.

Some embodiments of the communication network 100 support multiple services that are directed to different use cases. The services can be referred to as "network slices." For example, the communication network 100 can instantiate a network slice to support broadband user data services such as music, film, or multimedia streaming. For another example, the communication network 100 can instantiate a network slice to support Internet-of-Things (IoT) services such as interconnecting wireless-enabled appliances, power or water meters, and the like. Numerous concurrent network slices can be supported by the communication network 100. Each network slice can be implemented using different numbers or combinations of virtual functions that are selected to support the service requirements of the network slice. Each of the virtual functions supports an interface that is configured using subsets of a set of interface modules available to the virtual functions. In some embodiments, new interface modules are defined to support communication via the interfaces.

Figure 2:
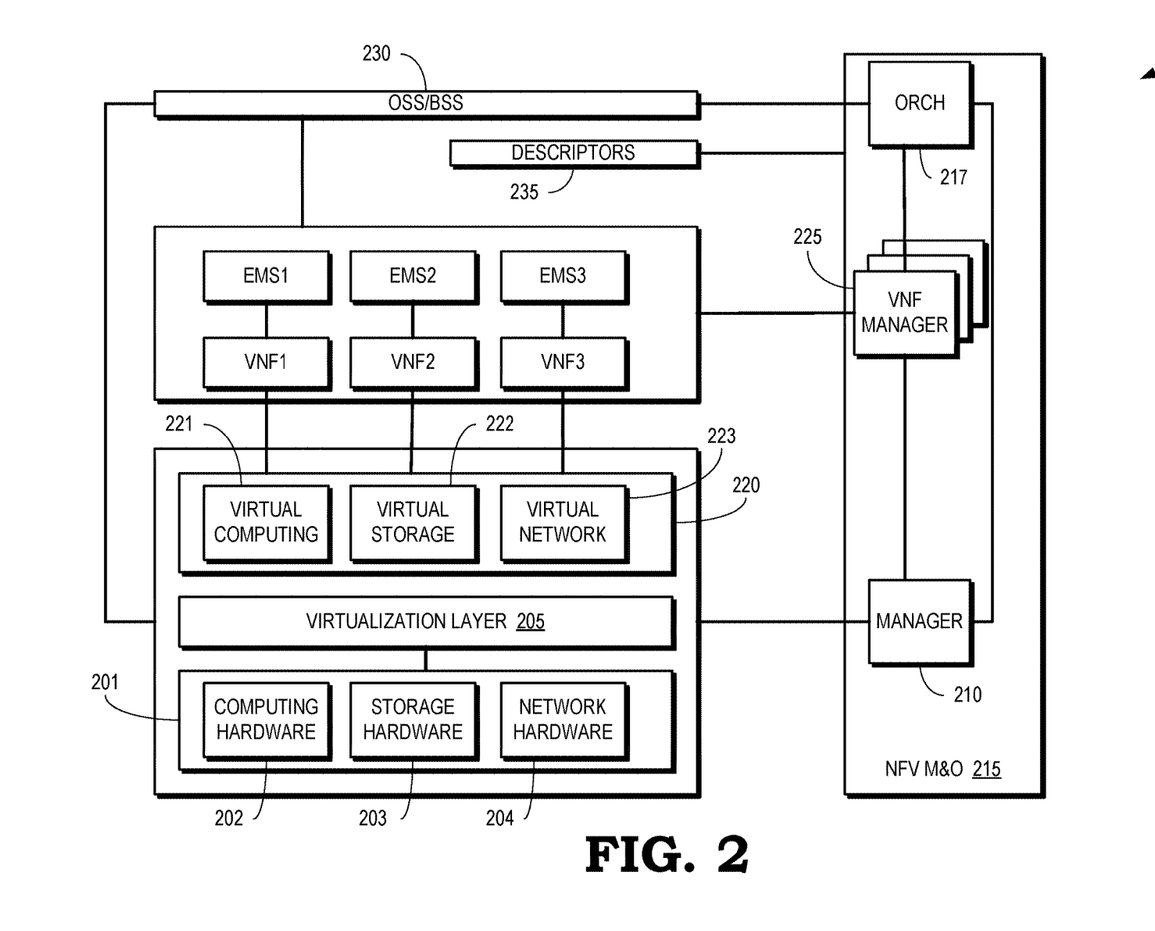
FIG. 2 is a block diagram of an NFV architecture according to some embodiments.

FIG. 2 is a block diagram of an NFV architecture 200 according to some embodiments. The NFV architecture 200 may be implemented in some embodiments of the communication network 100 shown in FIG. 1. The NFV architecture 200 includes hardware resources 201 including computing hardware 202, storage hardware 203, and network hardware 204. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O module 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the corresponding virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

Figure 3:
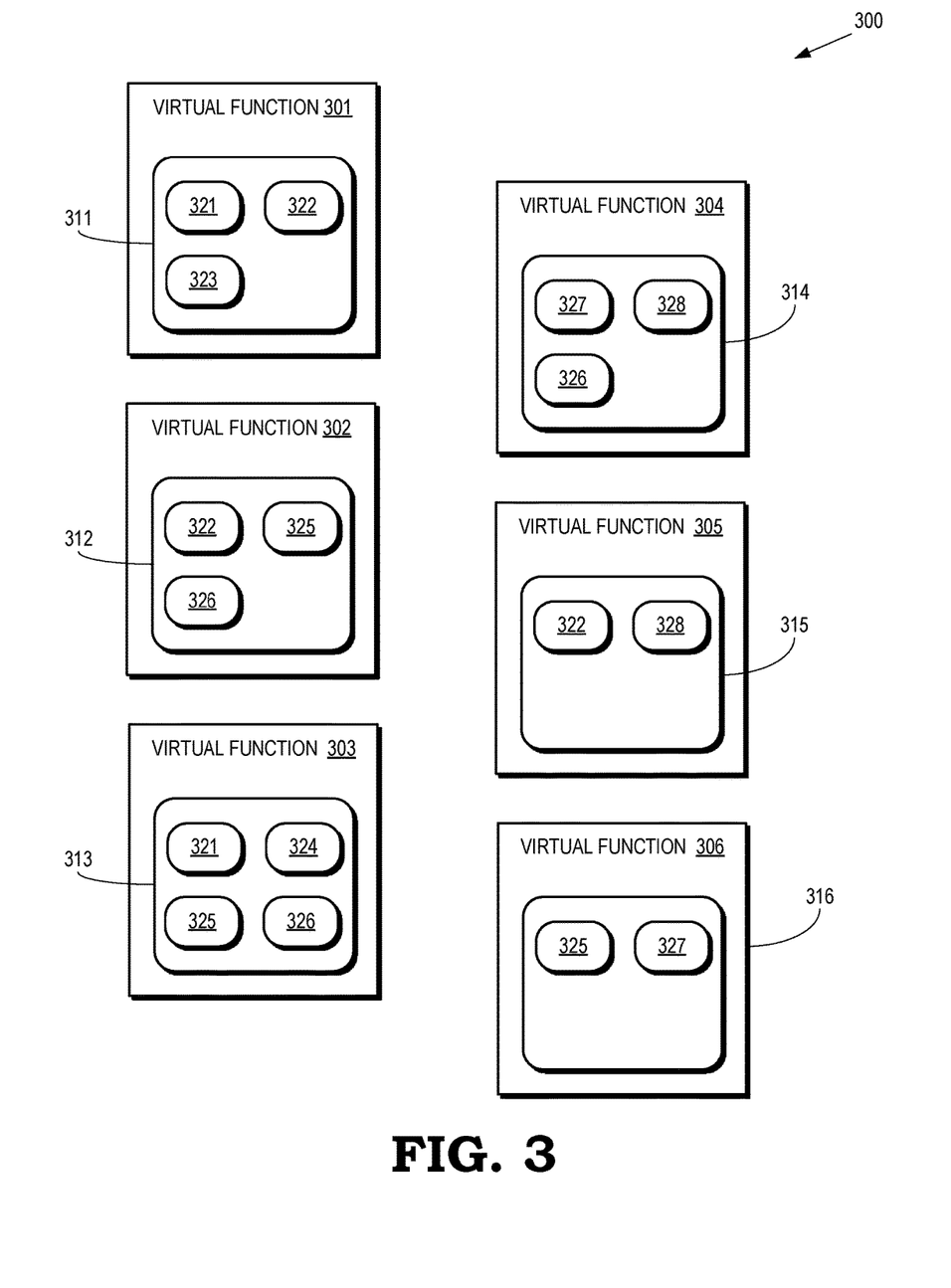
FIG. 3 is a block diagram of a set of virtual functions that each implement a single interface using a configurable number of interface modules according to some embodiments.

FIG. 3 is a block diagram of a set 300 of virtual functions that each implement a single interface using a configurable number of interface modules according to some embodiments. The set 300 can be implemented in some embodiments of the communication network 100 shown in FIG. 1 or some embodiments of the NFV architecture 200 shown in FIG. 2. The set 300 includes virtual functions 301, 302, 303, 304, 305, 306 that are collectively referred to herein as "the virtual functions 301-306." The virtual functions 301-306 can implement different micro-functions. For example, the virtual function 301 performs mobility management micro-functions, the virtual function 302 performs authentication micro-functions, the virtual function 303 performs session management micro-functions, the virtual function 304 performs charging micro-functions, the virtual function 305 performs lawful intercept micro-functions, and the virtual function 306 performs radio access network micro-functions. As discussed herein, more or fewer virtual functions that implement more or fewer micro-functions, or which implement functions at a different level of granularity, can be implemented in some embodiments.

The virtual functions 301-306 communicate with each other over corresponding interfaces 311, 312, 313, 314, 315, 316, which are collectively referred to herein as "the interfaces 311-316." Each of the virtual functions 301-306 implements a single interface 311-316 and each of the interfaces 311-316 is configured using one or more interface modules. The interface 311 of the virtual function 301 is configured using the interface modules 321, 322, 323. The interface module 321 is a control plane protocol module that supports a set of messages used to program routes within a communication network such as the communication network 100 shown in FIG. 1. The interface module 322 is a user plane protocol module that supports reception of route programming messages that are used to program routes. The interface modules 321, 322 are therefore compatible interface modules that can be used to support communication between virtual functions that implement the interface modules 321, 322. Some embodiments of the interface modules 321, 322 are standardized. The interface module 323 is a proprietary module that is only supported by a vendor and the vendor's partners. A vendor using proprietary interface modules such as the interface module 323 is able to offer an open interface for the proprietary interface modules to third parties to establish a de-facto eco-system with capabilities that go beyond what may be possible using only standardized interface modules.

The interface 312 to the virtual function 302 is configured using the interface modules 322, 325, 326. The virtual function 302 is therefore able to communicate with the virtual function 301 because the interface 312 is configured using the interface module 322, which is compatible with the interface module 321 used to configure the interface 311. As discussed herein, the virtual function 302 can discover that the interface 311 is configured using the compatible interface module 321, e.g., by querying a registry such as the registry 175 shown in FIG. 1. In the illustrated embodiment, the interface modules 325, 326 are compatible with each other.

The interface 313 to the virtual function 303 is configured using the interface modules 321, 324, 325, 326. The virtual function 303 is therefore able to communicate with the virtual function 301 because the interface 313 is configured using the interface module 321, which is compatible with the interface module 322 used to configure the interface 311. In addition, the interface module 324 is a proprietary interface module that is compatible with the proprietary interface module 323. The virtual functions 301, 303 are therefore also able to communicate via their corresponding interfaces 311, 313 according to the protocols defined by the compatible interface modules 323, 324. The virtual function 303 is also able to communicate with the virtual function 302 due to compatibility of the interface modules 321, 322 and compatibility of the interface modules 325, 326.

The interface 314 to the virtual function 304 is configured using the interface modules 326, 327, 328. In the illustrated embodiment, the interface module 327, 328 are compatible. The interface 315 to the virtual function 305 is configured using the interface modules 322, 328. The interface 316 to the virtual function 306 is configured using the interface modules 325, 327. As discussed herein, the virtual functions 304, 305, 306 are able to communicate with other virtual functions that implement interfaces configured using compatible interface modules. The set of interface modules available to the virtual functions 301-306 therefore includes the interface modules 321-328. However, in some embodiments, more or fewer virtual functions can be instantiated in the set 300, the set of interface modules can include more or fewer interface modules, and the subsets of the set of interface modules that are used to configure the interfaces 311-316 can include more, fewer, or different interface modules selected from the set of interface modules.

Figure 4:
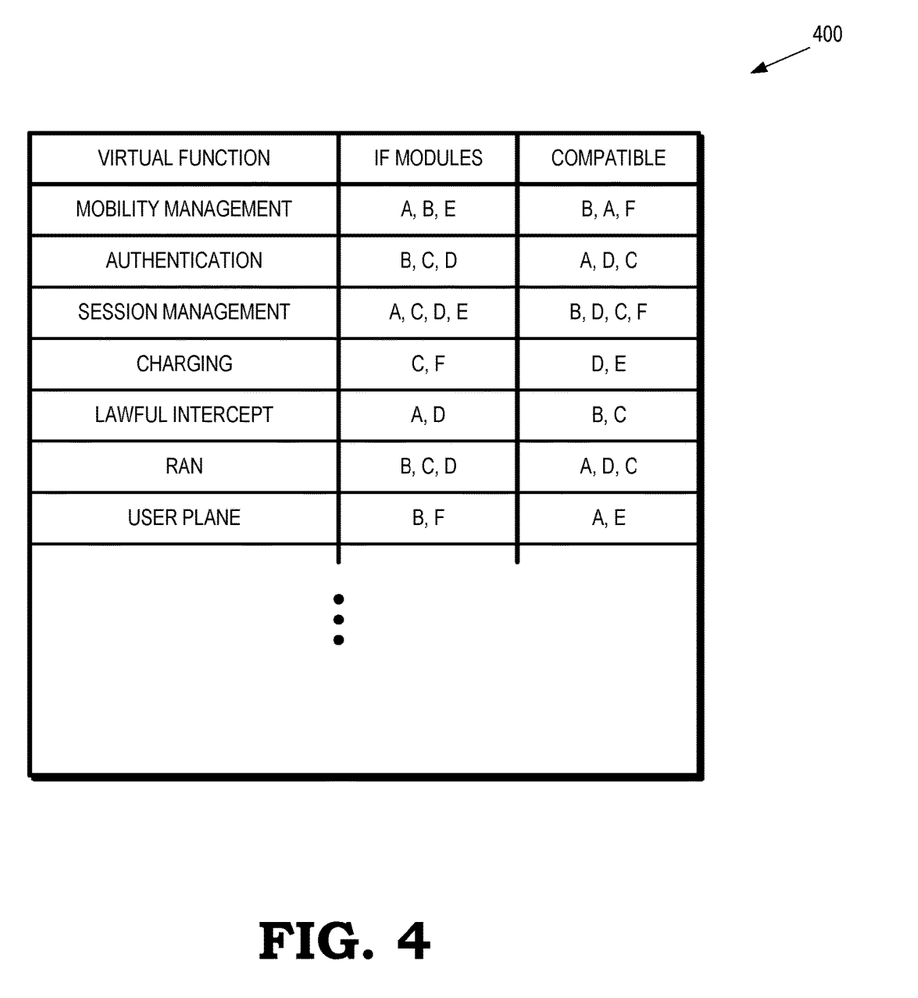
FIG. 4 is a block diagram of a data structure that is used to store identities of virtual functions, supported interface modules, and compatible interface modules according to some embodiments.

FIG. 4 is a block diagram of a data structure 400 that is used to store identities of virtual functions, supported interface modules, and compatible interface modules according to some embodiments. The data structure 400 can be stored in a memory such as the memory 185 in the registry 175 shown in FIG. 1. The data structure 400 is modified in response to receiving information identifying a virtual function, its supported interface modules, and the interface modules that are compatible with the supported interface modules. Information stored in the data structure 400 can be provided to entities such as virtual functions that request information identifying other virtual functions that are configured using interface modules that are compatible with the interface modules used to configure and interface to the requesting virtual function, as discussed herein.

The data structure 400 includes a first column that identifies the virtual function. For example, the data structure 400 includes identifiers of a mobility management function, an authentication function, a session management function, a charging function, a lawful interception function, a radio access network (RAN) function, and a user plane function. Some embodiments of the data structure 400 are also able to store numerical identifiers of the virtual functions.

The second column in the data structure 400 includes information identifying the interface (IF) modules that are used to configure the interfaces to the corresponding virtual functions. For example, an interface to the mobility management function is implemented using interface modules A, B, E. For another example, an interface to the authentication function is implemented using interface modules B, C, D.

The third column in the data structure 400 includes information identifying the interface modules that are compatible with the interface modules used to configure interfaces to the virtual functions. For example, the interface modules B, A, F are compatible with the interface modules A, B, E used to configure an interface to the mobility management function. Some embodiments of the data structure 400 do not include the third column. Instead, virtual functions can be provided with information mapping compatibility between the set of interface modules that are used to configure interfaces for the virtual functions. Each virtual function can then determine compatible interface modules based on the mapping and the interface modules used to configure its interface.

Figure 5:
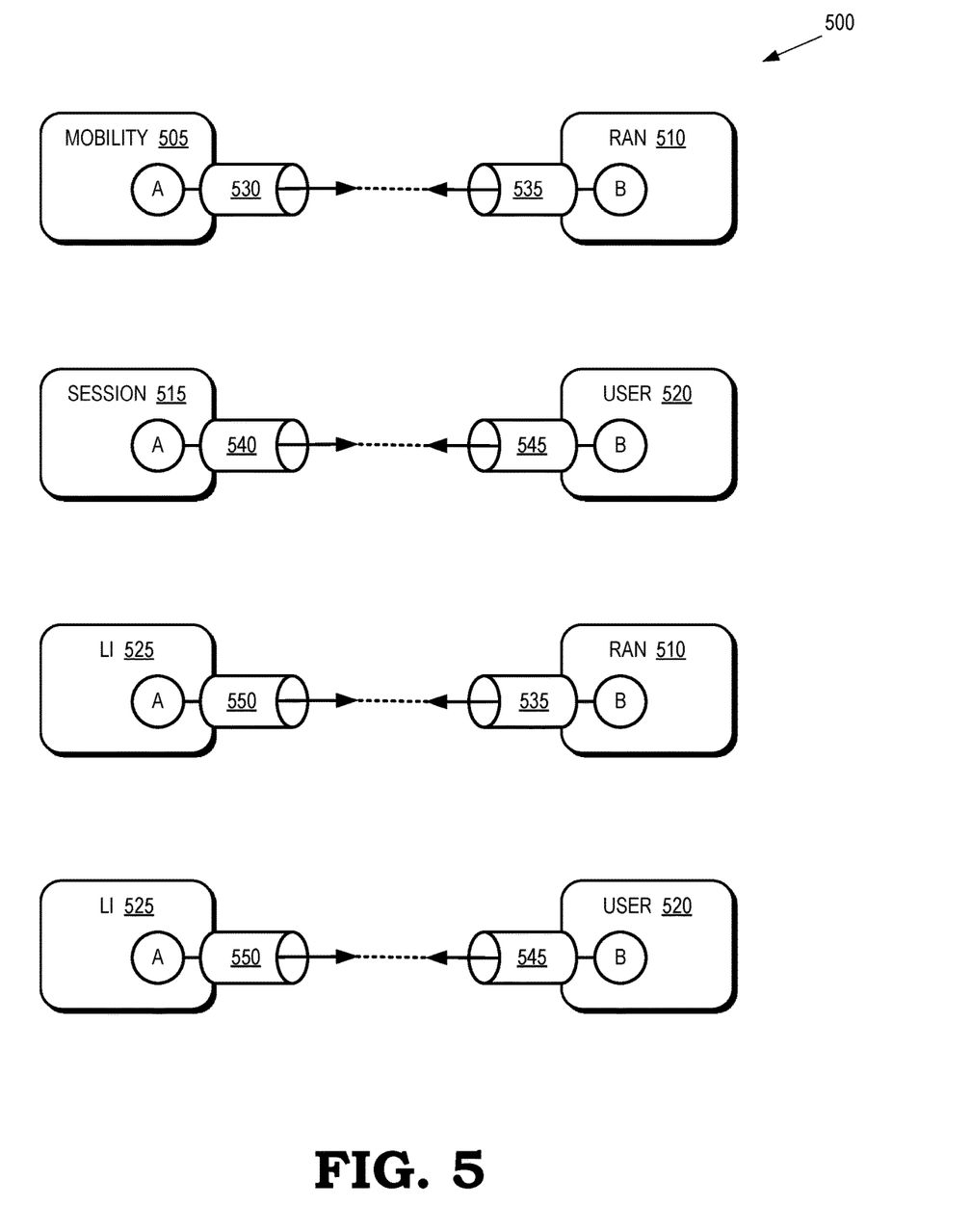
FIG. 5 is a block diagram of a set of communication pathways established between virtual functions using compatible interface modules according to some embodiments.

FIG. 5 is a block diagram of a set 500 of communication pathways established between virtual functions using compatible interface modules according to some embodiments. The virtual functions included in the set 500 are a mobility virtual function 505, a RAN virtual function 510, a session management virtual function 515, a user plane virtual function 520, and a lawful intercept (LI) virtual function 525. The virtual functions 505, 510, 515, 520, 525 establish communication pathways using corresponding interfaces 530, 535, 540, 545, 550. The interfaces 530, 540, 550 are configured using the interface module A. Some embodiments of the interfaces 530, 540, 550 are also configured using additional interface modules (not shown in FIG. 5). The interfaces 535, 545 are configured using the interface module B. Some embodiments of the interfaces 535, 545 are also configured using additional interface modules (not shown in FIG. 5). The interface modules A and B are compatible with each other.

The virtual functions 505, 510, 515, 520, 525 can establish a communication pathway with any other virtual function that uses a compatible interface module to configure its interface. For example, the mobility virtual function 505 can establish a communication pathway with the RAN virtual function 510. The session management function 515 can establish a communication pathway with the user plane virtual function 520. The lawful intercept virtual function 525 can establish a communication pathway with the RAN virtual function 510. The lawful intercept virtual function 525 can also establish a communication pathway with the user plane virtual function 520. Some embodiments of the lawful intercept virtual function 525 concurrently establish the communication pathways with the RAN virtual function 510 and the user plane virtual function 520, which can then be used for concurrent communication with the lawful intercept virtual function 525. Thus, a virtual function that implements a single interface configured with an interface module is able to form multiple communication pathways with other virtual functions that implement a single interface configured with a compatible interface module.

Figure 6:
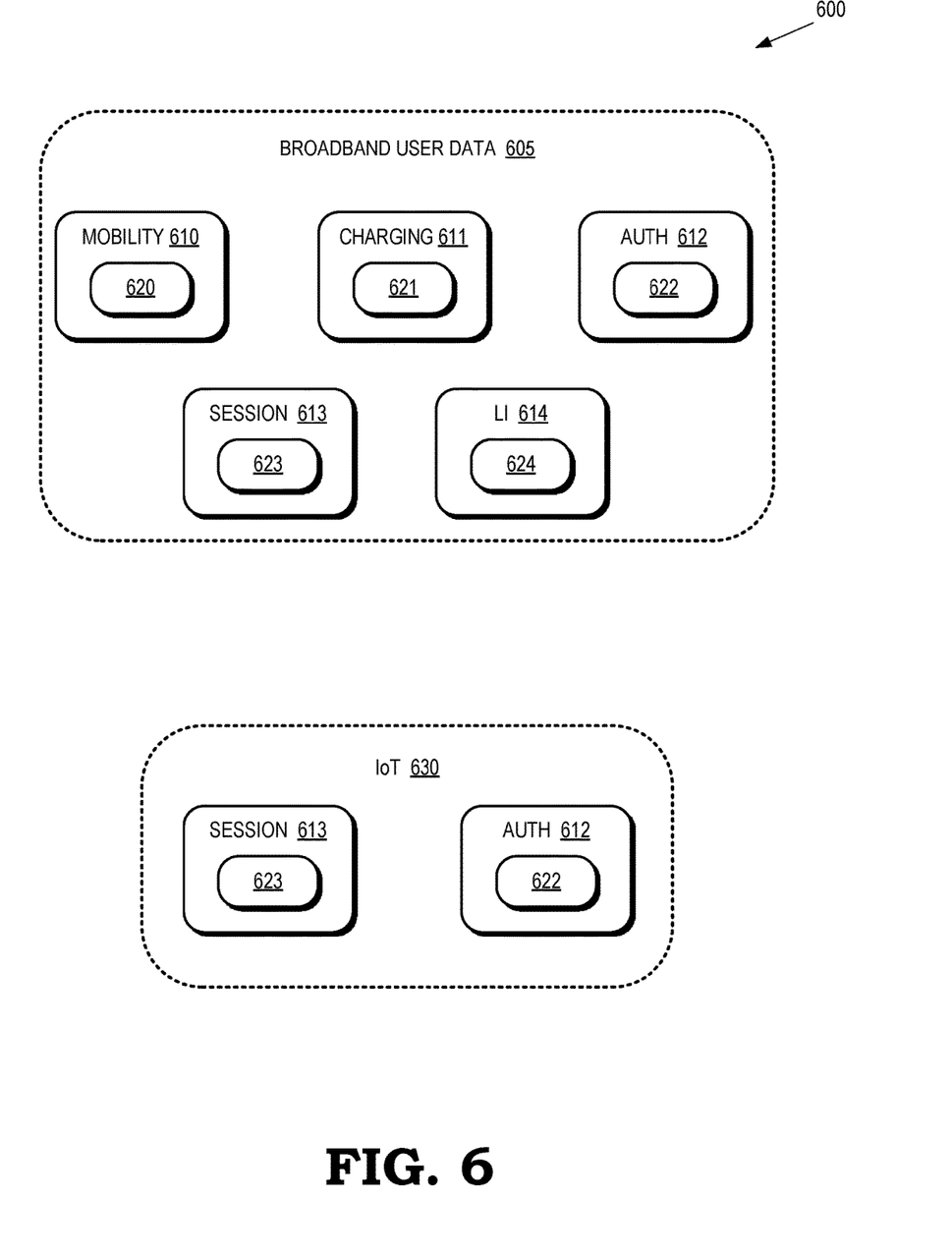
FIG. 6 is a block diagram of a set of network slices that are supported by different combinations of virtual functions according to some embodiments.

FIG. 6 is a block diagram of a set 600 of network slices that are supported by different combinations of virtual functions according to some embodiments. The set 600 can be implemented in some embodiments of the communication network 100 shown in FIG. 1 or the NFV architecture 200 shown in FIG. 2.

The set 600 includes a first network slice 605 that is configured to support the service requirements of a service that provides broadband user data. The first network slice 605 instantiates a mobility management virtual function 610, a charging virtual function 611, an authentication virtual function 612, a session management virtual function 613, and a lawful intercept virtual function 614, which are collectively referred to herein as "the virtual functions 610-614." Each of the virtual functions 610-614 has a corresponding one of the interfaces 620, 621, 622, 623, 624, which are collectively referred to herein as "the interfaces 620-624." As discussed herein, the interfaces 620-624 are configured using selected combinations of interface modules (not shown in FIG. 6 in the interest of clarity).

The set 600 includes a second network slice 630 that is configured to support the service requirements of a service provided to support IoT. Authentication functionality is important for IoT devices and so the network slice 630 implements the authentication virtual function 612 with the corresponding interface 622. The network slice 630 also implements the session management virtual function 613 and its corresponding interface 623. Long battery life and low cost are high priorities for IoT wireless communication devices, but IoT devices that need not be reached from the network typically do not utilize idle mode mobility functions or active mobility management functions, which unnecessarily consume network resources, reduce battery life, and increase cost. The second network slice 630 therefore does not implement the mobility management virtual function 610. There is no charge for usage of the second network slice 630 and so the second network slice 630 does not implement the charging virtual function 611. People do not communicate using services provided to the IoT devices by the second network slice 630 and so there is no need for lawful intercept. The second network slice 630 therefore does not implement the lawful intercept virtual function 614.

Figure 7:
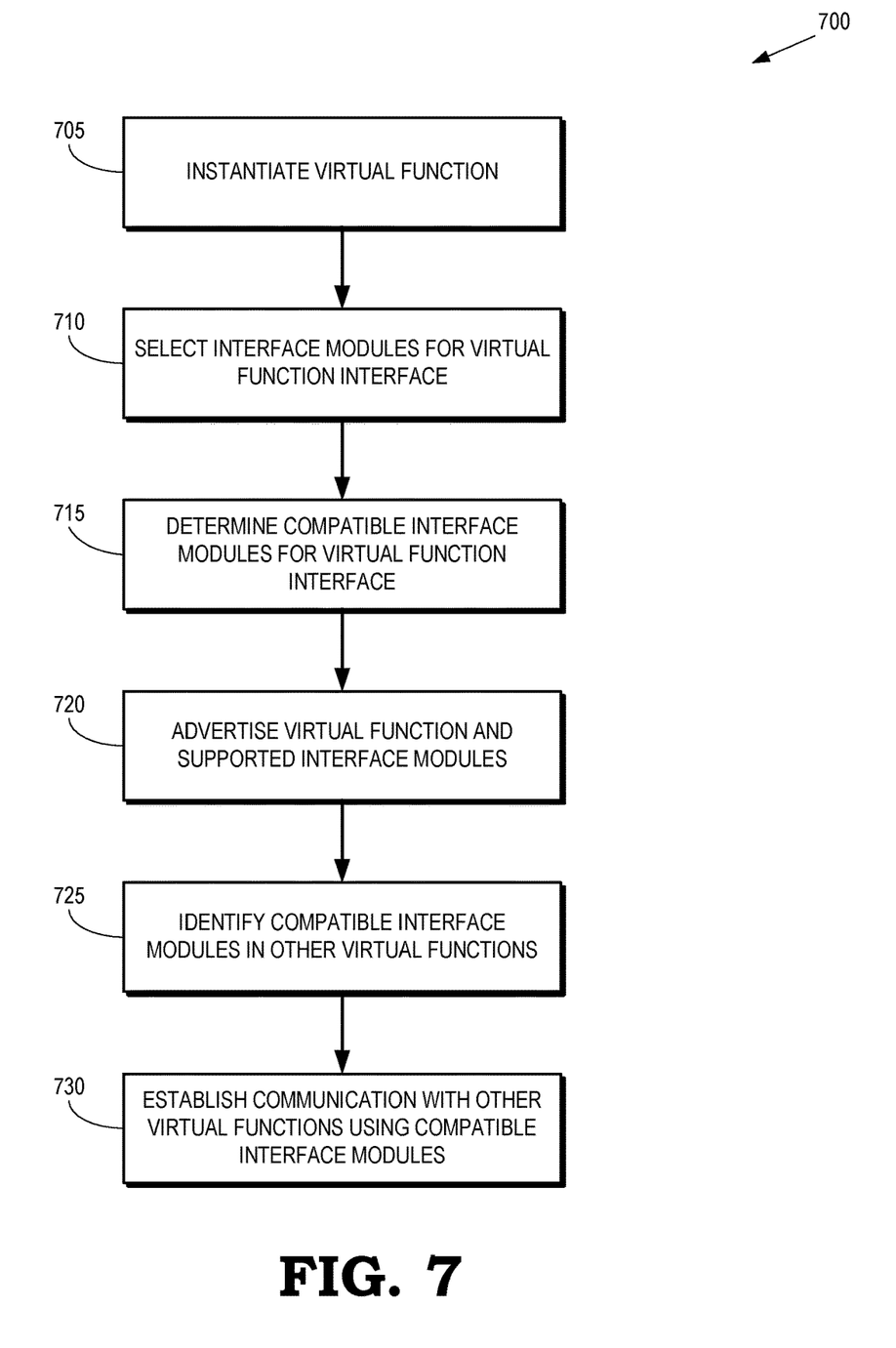
FIG. 7 is a flow diagram of a method for instantiating virtual functions that include interfaces configured on the basis of subsets of a set of interface modules according to some embodiments.

FIG. 7 is a flow diagram of a method 700 for instantiating virtual functions that include interfaces configured on the basis of subsets of a set of interface modules according to some embodiments. The method 700 is implemented in some embodiments of the communication network 100 shown in FIG. 1 or the NFV architecture 200 shown in FIG. 2.

At block 705, a virtual function is instantiated using resources of a virtual architecture such as the communication network 100 shown in FIG. 1 or the NFV architecture 200 shown in FIG. 2. The virtual function is configured to provide one or more services to user equipment.

At block 710, a subset of interface modules is selected from a set of available interface modules. The subset of interface modules is selected based upon the services that are supported by the virtual function and are used to configure an interface to the virtual function.

At block 715, the system determines the interface modules that are compatible with the interface modules used to configure the interface. The compatible interface modules can be identified using a mapping between compatible interface modules.

At block 720, the identity of the virtual function and its supported interface modules are advertised. As discussed herein, the information can be advertised by broadcasting the information to the wireless communication system, establishing a query/response relationship between the virtual function and the other virtual functions, publishing the information in a registry that is accessible to other virtual functions, or other advertising technique. Some embodiments of the virtual function also advertise interface modules that are compatible with its supported interface modules.

At block 725, the virtual function identifies compatible interface modules that are used to configure interfaces to other virtual functions. The compatible interface modules (or the corresponding virtual functions) can be identified based on information advertised by the other virtual functions. For example, the virtual function can query a registry that stores information identifying the other virtual functions and the compatible interface modules.

At block 730, the virtual function establishes communication with one or more other virtual functions via their interfaces according to the protocols determined by the compatible interface modules.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    instantiating a first virtual function using a virtual infrastructure that is deployed over at least one server in a communication system;
    selecting a first subset of interface modules from a set of interface modules;
    configuring a first interface to the first virtual function using the first subset; and
    establishing communication between the first virtual function and a second virtual function over the first interface based on a first interface module in the first subset and a second interface module, wherein a second interface to the second virtual function is configured based on the second interface module.

2. The method of claim 1, wherein the second interface is configured with a second subset of the set of interface modules, and wherein the second subset includes the second interface module.

3. The method of claim 1, wherein the first subset includes at least one interface module from the set of interface modules that is also included in a second subset of interface modules selected from the set of interface modules that configure a third interface to a third virtual function.

4. The method of claim 1, wherein selecting the first subset of interface modules comprises selecting the first subset of interface modules based on services provided by the first virtual function.

5. The method of claim 1, wherein selecting the first subset comprises:
    defining a new interface module;
    identifying at least one other interface module that is compatible with the new interface module;
    adding the new interface module to the set of interface modules; and
    selecting the new interface module.

6. The method of claim 1, further comprising:
    advertising information identifying the first virtual function and the first subset of interface modules used to configure the first interface to the first virtual function.

7. The method of claim 6, wherein advertising the information comprises at least one of broadcasting the information to the communication system, establishing a query/response relationship between the first virtual function and at least one other virtual function, and publishing the information in a registry that is accessible to other virtual functions.

8. The method of claim 1, further comprising:
    establishing communication between the first virtual function and a third virtual function over the first interface via a third interface to the third virtual function, wherein the third interface is configured with a second subset of the set of interface modules that includes the second interface module, and wherein communication between the first virtual function and the third virtual function is established concurrently with communication between the first virtual function and the second virtual function.

9. An apparatus, comprising:
    memory hardware to store data and instructions;
    computing hardware to implement a virtual infrastructure using data and instructions stored in the memory hardware, wherein the computing hardware is configured to instantiate a first virtual function, select a first subset of interface modules from a set of interface modules, and configure a first interface to the first virtual function using the first subset; and
    network hardware to interconnect the memory hardware and the computing hardware, wherein the networking hardware is configured to establish communication between the first virtual function and a second virtual function over the first interface based on a first interface module in the first subset and a second interface module, wherein a second interface to the second virtual function is configured based on the second interface module.

10. The apparatus of claim 9, wherein the second interface is configured with a second subset of the set of interface modules, and wherein the second subset includes the second interface module.

11. The apparatus of claim 9, wherein the first subset includes at least one interface module from the set of interface modules that is also included in a second subset of interface modules selected from the set of interface modules that configure a third interface to a third virtual function.

12. The apparatus of claim 9, wherein the computing hardware is configured to select the first subset of interface modules based on services provided by the first virtual function.

13. The apparatus of claim 9, wherein the computing hardware is further configured to:
    define a new interface module;
    identify at least one other interface module that is compatible with the new interface module;
    add the new interface module to the set of interface modules; and
    select the new interface module for configuring the first interface.

14. The apparatus of claim 9, wherein the computing hardware is further configured to:
    advertise information identifying the first virtual function and the first subset of interface modules used to configure the first interface to the first virtual function.

15. The apparatus of claim 14, wherein the network hardware is further configured to advertise the information by performing at least one of broadcasting the information, establishing a query/response relationship between the first virtual function and at least one other virtual function, and publishing the information in a registry that is accessible to other virtual functions.

16. The apparatus of claim 9, wherein the network hardware is further configured to:
    establish communication between the first virtual function and a third virtual function over the first interface via a third interface to the third virtual function, wherein the third interface is configured with a second subset of the set of interface modules that includes the second interface module, and wherein communication between the first virtual function and the third virtual function is established concurrently with communication between the first virtual function and the second virtual function.

17. A method, comprising:

instantiating a first set of virtual functions for a first network slice supported by a virtual infrastructure that is deployed over at least one server in a communication system, wherein the first set of virtual functions is selected based on service requirements of the first network slice;

configuring an interface for each virtual function in the first set of virtual functions using different subsets of interface modules from a set of interface modules; and establishing communication between sets of the virtual functions over the interfaces based on interface modules in the different subsets used to configure the interfaces.

18. The method of claim 17, further comprising:

advertising information identifying the first set of virtual functions and the subsets of interface modules used to configure the corresponding interfaces.

19. The method of claim 18, wherein advertising the information comprises at least one of broadcasting the information to the communication system, establishing query/response relationships between the virtual functions, and publishing the information in a registry that is accessible to the virtual functions.

20. The method of claim 17, further comprising:

instantiating a second set of virtual functions for a second network slice supported by the virtual infrastructure, wherein the second set of virtual functions is selected based on service requirements of the second network slice, and wherein the second set of virtual functions is different than the first set of virtual functions;

configuring an interface for each virtual function in the second set of virtual functions using different subsets of interface modules from the set of interface modules; and establishing communication between subsets of the virtual functions in the first set and the second set over the interfaces based on compatible interface modules in the different subsets used to configure the interfaces.

* * * * *